Figure 13:
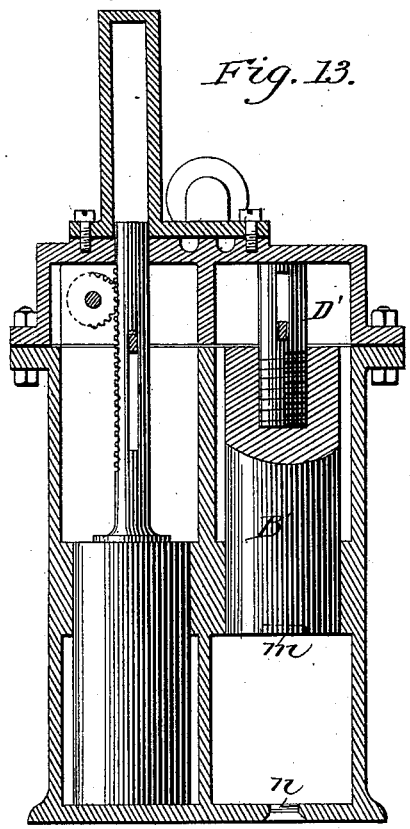

(No Model.) 3 Sheets—Sheet 1.
J. J. TYLOR.
APPARATUS FOR INDICATING THE SPEED AND QUANTITY OF LIQUIDS.
No. 363,922. Patented May 31, 1887.
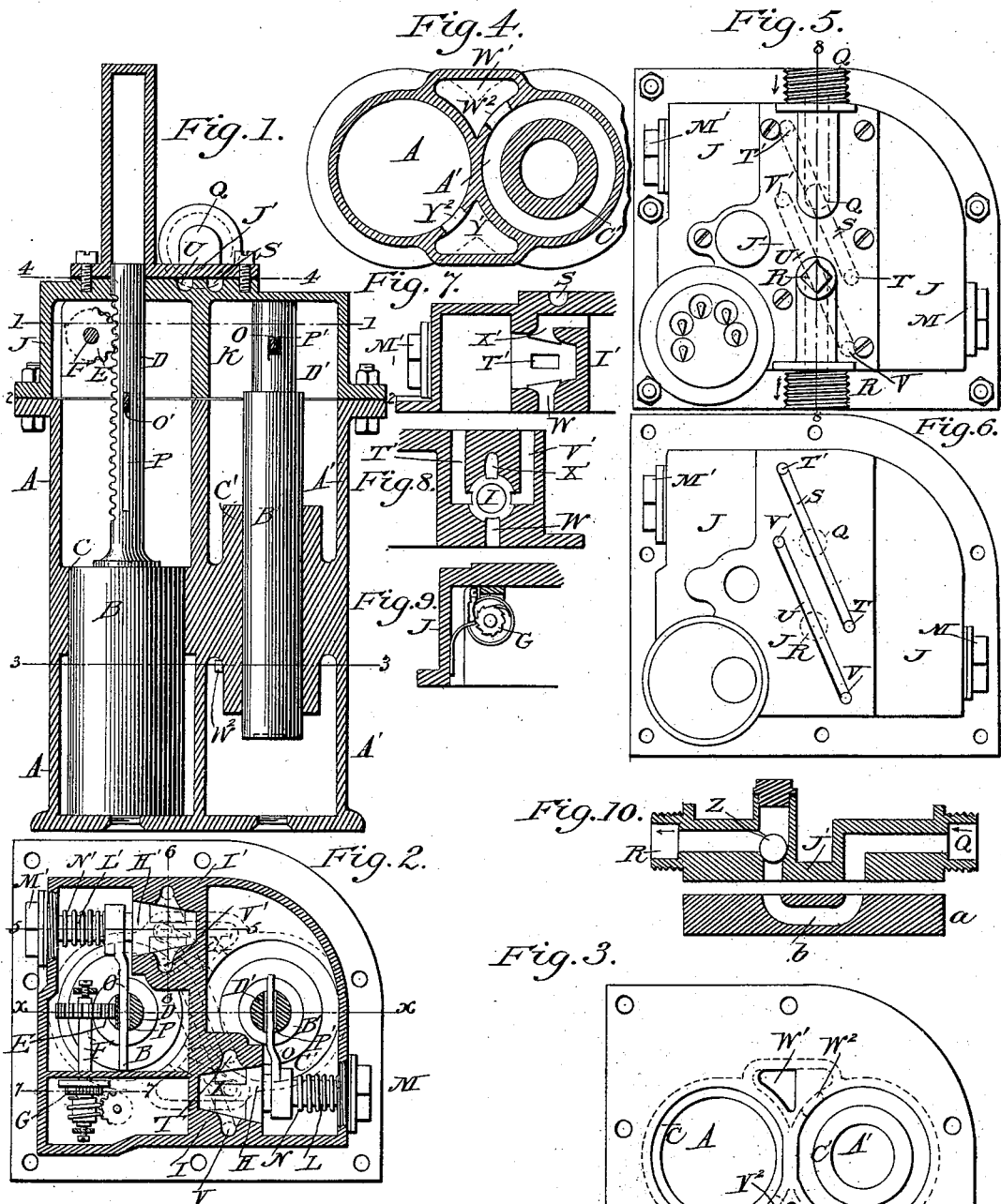

(No Model.)  3 Sheets—Sheet 2.
J. J. TYLOR.
APPARATUS FOR INDICATING THE SPEED AND QUANTITY OF LIQUIDS
No. 363,922.  Patented May 31, 1887.
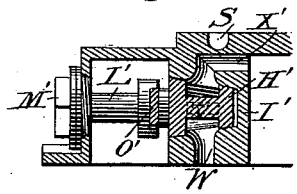
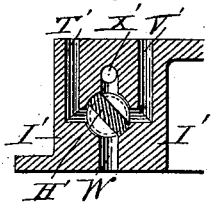
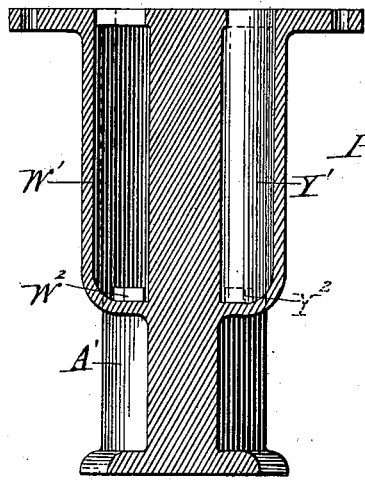
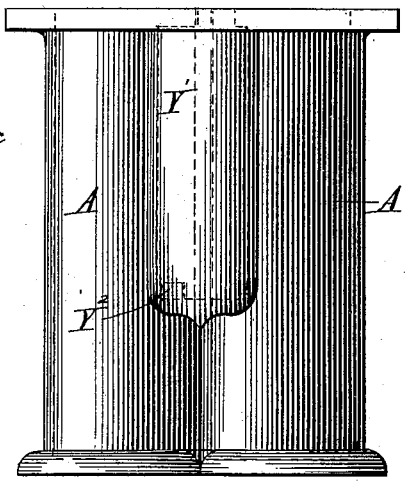
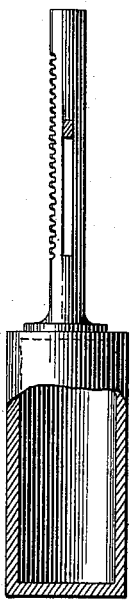
Witnesses.  Inventor:

(No Model.) 3 Sheets—Sheet 3.
J. J. TYLOR.
APPARATUS FOR INDICATING THE SPEED AND QUANTITY OF LIQUIDS.
No. 363,922. Patented May 31, 1887.

Witnesses.
Stephen Edward Gunnyon
Edward O. Barker

Inventor:
J. J. Tylor
by his Attorney
M. B. Block

United States Patent Office.

JOSEPH JOHN TYLOR, OF WESTMINSTER, ENGLAND.

APPARATUS FOR INDICATING THE SPEED AND QUANTITY OF LIQUIDS.

SPECIFICATION forming part of Letters Patent No. 363,922, dated May 31, 1887.

Application filed October 23, 1883. Serial No. 109,849. (No model.) Patented in England February 22, 1883, No. 968; in France August 22, 1883, No. 157,186, and in Victoria November 27, 1883, No. 3,606.

*To all whom it may concern:*

Be it known that I, JOSEPH JOHN TYLOR, a subject of the Queen of Great Britain, and residing at 11 Little Queen Street, in the city of Westminster, and Kingdom of Great Britain, have invented certain new and useful Improvements in Liquid-Meters, (for which I have obtained Letters Patent in Great Britain, dated February 22, 1883, No. 968; Letters Patent in France, dated August 22, 1883, No. 157,186, and Letters Patent in the British colony of Victoria, dated November 27, 1883, No. 3,606;) and I do hereby declare that the following is a full, clear, and exact description of the invention, which will enable others skilled in the art to which it appertains to make and use the same.

This invention relates to improvements in piston meters and part thereof to improvements on the invention for which British Letters Patent were granted to me and William Alfred Tylor, dated 21st July, 1880, No. 3,007.

The object of the present invention is to simplify, perfect, and cheapen liquid-meters, especially when intended for the measurement of small daily consumptions of water, such as those for domestic use, or where the water has to be measured at the rate of a gallon an hour or upward, which object has never before been obtained in practice, as far as I am aware, except by the use of leathered pistons, which frequently set fast with moderate pressures.

The improvements relate, particularly, to such meters as have two uncontrolled, unconnected, or independent pistons or rams, each of which is so related to the valve arrangements of the other that each piston or ram at some point in its stroke reverses the valve of the other; also, to meters in which a smaller piston or ram, or a diaphragm, is arranged to operate the valve of the larger piston or ram.

In meters of this class as heretofore constructed the registrations vary as much as fifteen per cent. when passing small quantities of water at low velocities, by reason of the variation of the stroke of the unregistered piston or ram, to which they are liable when working under those conditions. In order to obviate this defect, I make the smaller piston or ram only just large enough to work the valve of the larger and of as short a stroke as is consistent with efficiency. By this means the error is reduced to an unimportant amount. I also place each of the valves (which I prefer to be in the form of plug-cocks) in an enlarged part or prolongation of the cylinder itself, instead of in a separate chamber distinct from the cylinders, each cylinder being provided with separate inlets and outlets, instead of inlets to the two cylinders opening into one common chamber and the outlets from the two cylinders opening into another common chamber, the chief object of this part of the improvements being to prevent shock, or to cushion the fluid or liquid. The cylinders, with their cover, are so arranged that they can be easily removed and opened out for cleaning or repair without disturbing the supply-pipe to the meter, there being only one joint to open.

In the drawings is illustrated a piston meter constructed in accordance with this invention.

Figure 1 is a vertical section taken through the two cylinders on line X X of Fig. 2, which is itself a horizontal section at line 1 1 of Fig. 1. Fig. 3 is a plan of the top of the cylinders at line 2 2 of Fig. 1, with the whole of the cover removed. Fig. 4 is a section at line 3 3 of Fig. 1. Fig. 5 is a complete plan with the cover in place; Fig. 6, a plan at line 4 4 of Fig. 1, with the upper part of the cover removed; Figs. 7, 8, and 9, sections on lines 5 5, 6 6, and 7 7, respectively, of Fig. 2, with the cock-plug removed. Fig. 1$^A$ is a section taken between the two cylinders and through the passages W' and Y' in Figs. 3 and 4. Fig. 1$^B$ is an elevation of the pair of cylinders with the cover and all the working parts removed; and Figs. 7$^A$ and 8$^A$ are sections corresponding to those shown in Figs. 7 and 8, respectively, but with the cock-plug in place. Fig. 1$^C$ shows the hollow piston; and Figs. 10 to 18 details of construction, to be hereinafter explained.

A and A' are the two cylinders. B and B' are the corresponding pistons or rams working through collars C and C', respectively.

D is a stem or rod formed on or secured to the plunger B, and having a toothed rack formed therein, which gears with a pinion, E, fixed on the spindle F, by which the counting apparatus is actuated through the medium of a pawl and ratchet-wheel, G, and worm-gearing in such manner that the said counting or registering apparatus is moved a distance proportional to the length of stroke of the plunger actually effected.
H and H' are cock-plugs working in the cases I I' contained in the enlarged parts, extensions, or prolongations of the cylinders A A' formed by the cover J, which cover contains a partition, K, separating the two cylinders with their enlarged parts from each other.

L L' are prolongations of the cock-plugs H H', forming guide-stems, which take into holes in the screw-plugs M M', which screw-plugs can be moved when it is required to examine or remove the plugs H and H'.

N N' are springs, which press the plugs H and H' against their seats.

O O' are levers fixed to the stems L L' of the plugs H H'. The free ends of these levers take into slots P P', formed in the stems D and D' of the rams B B'. The up-and-down motion of the rams B and B' is thus caused to operate the levers O O', and thereby the plugs H H', to effect the admission of the liquid to and its discharge from the cylinders.

Q is the inlet for liquid to the meter, and R the outlet for liquid from the same. The inlet-passage Q communicates with the narrow passage S, formed in the top of the cover J.
One end of the passage S communicates with the inlet-passage T (in the casing I) leading to the cock-plug H, and the other end with the inlet-passage T' (in the casing I') leading to the cock-plug H'. The outlet-passage R is in communication with the narrow passage U, also formed in the top part of the cover J. One end of this passage U communicates with the outlet-passage V (in the casing I) leading from the cock-plug H, and the other end with the outlet-passage V' (in the casing I') leading from the cock-plug H'. The passages S and U are covered water-tight, and thus separated from each other by the upper cover, J', containing the inlet and outlet passages Q and R.
A passage, W, leads from the cock-plug H' into the passage W', Figs. 3, 4, 7, 7$^A$, 8, and 8$^A$, which communicates with the lower part of the cylinder A' by the hole W$^2$. A passage, X', leads from the cock-plug H' into the upper part of the cylinder A'. A passage similar to W leads from the cock-plug H to the passage Y', Figs. 3 and 4, which communicates with the lower part of the cylinder A by the hole Y$^2$, and a passage, X, similar to X', leads from the cock-plug H into the upper part of the cylinder A.

It will now be understood that as the ram B approaches the lower end of its stroke it operates the plug H' by means of the lever O', and liquid is thereby admitted to the upper side of the ram B' through the passages Q S T', the plug H', and the passage X', the liquid below the said ram B' being then free to escape through the passages W$^2$ W' W, the plug H', and the passages V', U, and R. The ram B' then makes a downstroke, and when near the end of such downstrokes it operates the plug H by means of the lever O, so as to put the upper end of the cylinder A in communication with the outlet-passage R by the passage X, the plug H, and the passages V and U, and the lower end of the cylinder A in communication with the inlet-passage Q by the passages S T, the plug H, and the passages Y' and Y$^2$. The ram B then makes an upstroke, and when near the end of such upstroke it reverses the position of the plug H', whereby the liquid is allowed to escape from above the ram B' through the passage X', the plug H', and the passages V', U, and R, and fresh liquid to enter below the ram B' through the passages Q S T', the plug H', and the passages W W' W$^2$. The ram B' then makes a stroke upward, and when approaching the end of such upward stroke it reverses the position of the plug H, whereby the liquid is allowed to escape from below the ram B through the passages Y$^2$ Y', the plug H, and the passages V, U, and R, and fresh liquid to enter above the ram B through the passages Q S T, the plug H, and the passage X, whereby the ram B is caused to make another stroke downward, reversing the position of the plug H', as before, thus completing the cycle of operations.

Figure 12:
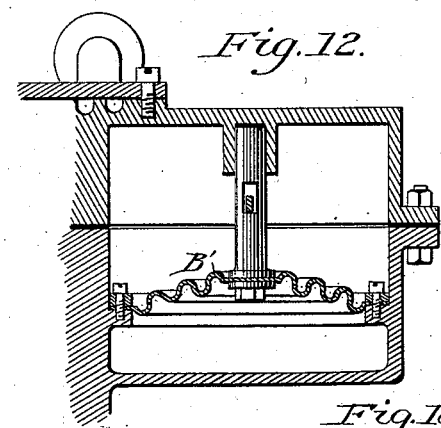
Figure 11:
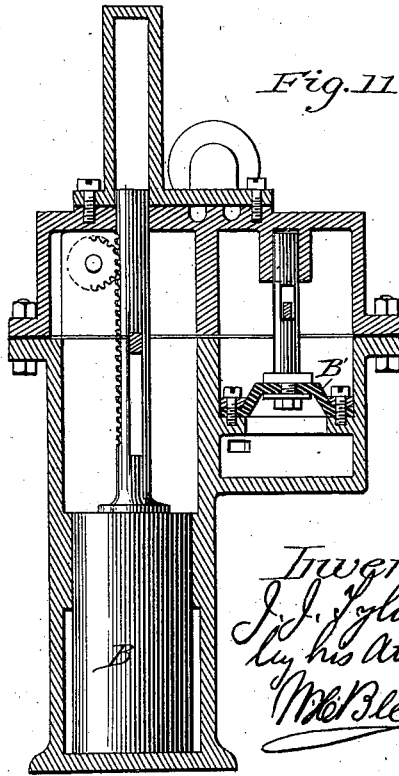

The effect of employing separate narrow inlet and outlet passages for each cylinder, instead of comparatively large inlet and outlet chambers common to both cylinders, is to cushion the liquid, and thereby to prevent shock. These narrow inlet and outlet passages should be so proportioned and so arranged that at the end of the strokes of the pistons or rams, when the two pistons are drawing from the same inlet-passage and discharging through the same outlet-passage, the flow of water shall not be sufficient to cause a serious shock. The pistons or rams move sometimes alone and sometimes together, and in order to make the error or irregularity in measurement, sometimes caused by variation in the length of stroke of the piston or ram, which does not act upon the registering apparatus, as small as possible, the said piston is, by preference, made as small and with as short a stroke as is consistent with efficient working of the valve of the larger piston or ram; but I sometimes substitute for the smaller piston or ram a diaphragm to work the valve or cock of the measuring piston or ram. Such an arrangement is illustrated in Fig. 11 of the drawings, in which B' represents a diaphragm, made of india-rubber or other suitable elastic material, which operates the valve or cock of the piston or ram B in the same manner as the small ram B' in Fig. 1 operates the plug-cock of the ram B in that figure. Fig. 12 shows a diaphragm, B', for the same purpose, but which is made of a corrugated disk of metal instead of india-rubber.

I also employ a back-pressure valve to prevent the escape of water from the consumer's service-pipe when the meter is removed. This arrangement is illustrated in Fig. 10, the upper part of which figure shows a section through the top cover, J', of the meter, taken on line 8 8 of Fig. 5.

Q is the inlet-passage to the meter, and R the outlet leading to the consumer's service-pipe.

Z is the back-pressure valve, which closes when the meter is disconnected from the top cover, J', and prevents the escape of water from the consumer's service-pipe, as above described. When the meter is so disconnected for the purpose of cleaning or repairing, or otherwise, the plate a, Fig. 10, with a connecting-passage, b, formed therein, may be secured to the top cover in place of the meter, and the supply of water be thereby continued through the passage b.

I prefer to make the pistons or rams of hardened india rubber or gutta-percha, which is somewhat elastic and of nearly the same specific gravity as water, and I prefer to make them hollow, (see Fig. 1$^c$,) so that they will float in water, the advantage of which is that pistons or rams so constructed will move with a much smaller head of water than the pistons or rams at present in use. Such material will also take a smooth polish, and is so hard as not to get scored in working in a metallic cylinder or through a metallic collar. The elasticity of the material tends to relieve the shock and to produce noiselessness, and prevents the pistons or rams from becoming indented or flattened. They can consequently be allowed to move much more quickly than metallic pistons or rams without causing shock.

When rams are employed, I prefer that they shall work through comparatively narrow collars in the cylinders, (instead of bearing throughout the full length of the cylinder,) as shown in the cylinder A, Fig. 1, and in both cylinders in Fig. 13, so as to reduce the surface in contact, and I find in practice that with this arrangement, when hardened india-rubber is used for the rams, no packing is required, and if preferred the collars may be bushed with the same material. The lower end of the collar in the cylinder A', for the ram B' to work through, may with advantage be made solid with the cylinder, so as to avoid the annular space shown, in which air may sometimes accumulate.

Figure 14:
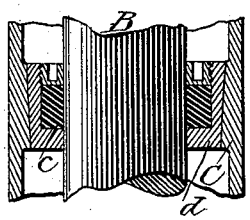

Fig. 14 shows an arrangement in which asbestus packing c is employed in the bush d, inserted into the narrow collar to make a water-tight joint round the metallic ram B. This is specially applicable when hot liquid is to be passed through the meter.

Figure 15:
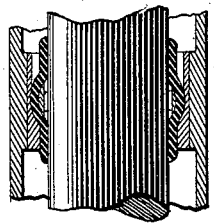
Figures 16, 17:
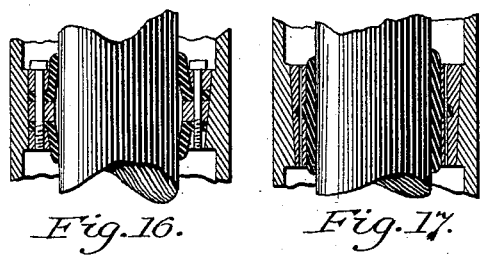

Figs. 15, 16, and 17 show arrangements of cup-leathers for making tight joints between the ram and the collars.

I prefer to employ plug-cocks, as shown in the drawings, provided with the necessary passages, instead of flat valves, as the latter are found in practice to offer too great resistance to movement and not to remain sufficiently tight for the small flows of water which occur in domestic supplies. I also prefer to use plug-cocks, in order to avoid arrangements requiring two flat surfaces in each valve-chamber to be kept liquid-tight, as is the case in some forms of meter. The plugs of these cocks are preferably made of hardened india-rubber similar to that used for the pistons or rams. The chief advantages of these plug-cocks being placed in separate chambers, as shown, and as above described, are that the connecting-passages are simplified, crossing of the ports or passages is avoided, and that the passages can be drilled out from the top, bottom, or sides of the casings, whereas it is difficult to insure the soundness and proper placing of such passages in small meters when cast in by coring in the usual way. These plug-cocks, especially when arranged as above described, also offer facilities for the application of leverage to move them, which is an important advantage for small flows as compared with valves which move at the same speed as the pistons by which they are actuated.

An important feature resulting from the arrangements of meter above described is that the valves or cocks are so arranged that if the pistons or rams become stopped by dirt or other derangement the supply of water through the meter is also stopped.

Figure 18:
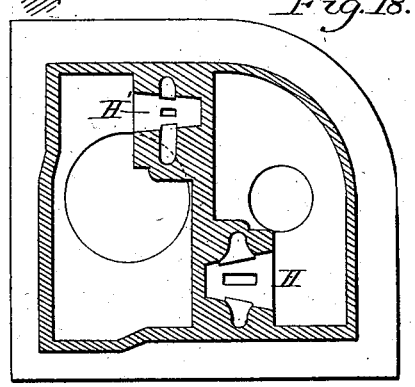

Fig. 18 shows an arrangement in which the plug-cock H', operated by the larger piston or ram, is made as small as possible, and the plug-cock H, operated by the smaller piston or ram, is made larger, to suit the supply of liquid to the larger piston or ram. The object of this arrangement is to avoid as much as possible the effect of the frictional resistance of a large valve on the measuring piston or ram.

The registering-movement is connected to one of the pistons or rams, preferably that which constitutes the measuring-instrument, and may consist of a rack and pinion and ratchet, as shown in Figs. 1, 2, and 9, for example.

I also provide means of correcting or adjusting the registering of the meter from the outside without taking the meter to pieces. The arrangement for effecting this is illustrated in Fig. 13. The stem D' is screwed into the ram B', and there is a nick, m, formed in the bottom of the ram to receive the point of a screw-driver, which can be inserted through a hole in the base of the meter when the plug n is removed therefrom. The length of the piston or ram can thus be increased or decreased at pleasure. The effect of increasing the length is to shorten the stroke, and thereby the traverse of the valve or cock, and that of decreasing the length is to lengthen the stroke, and consequently the traverse of the valve or cock. This arrangement can be applied to either or both of the pistons or rams.

I claim—

1. In liquid-meters, the combination of two uncontrolled, unconnected, or independent pistons or rams, B B', with valves H and H', the valve H, governing the movements of the piston or ram B, being placed in an enlargement, extension, or prolongation of the working-cylinder A', and operated by the piston or ram B', and the valve H', governing the movement of the piston or ram B', being placed in an enlargement, extension, or prolongation of the working-cylinder A, and operated by the piston or ram B, the enlargement, extension, or prolongation of the cylinder A being separated from that of the cylinder A' by the partition K, as hereinbefore described, and illustrated in the drawings hereto annexed, and for the purpose set forth.

2. In liquid-meters, the combination of two uncontrolled, unconnected, or independent pistons or rams, B and B', with valves or plug-cocks H and H', operated by levers O and O', which are moved by such pistons or rams B and B', as hereinbefore described, and illustrated in the drawings hereto annexed.

3. In liquid-meters, the combination of two uncontrolled, unconnected, or independent displacement devices, the displacement of one of which is small as compared with that of the other, each such displacement device operating the valve or plug cock of the other by means of a lever, whereby the error of registration which occurs in meters with uncontrolled displacement devices when passing small quantities of liquid, or liquid at low velocities, is more or less completely obviated, as hereinbefore described, and illustrated in the drawings hereto annexed.

4. In liquid-meters, the combination of two uncontrolled, unconnected, or independent pistons or rams, B and B', the displacement of one of which, as B', is small compared with that of the other, the piston or ram B operating the valve or plug cock H' of the ram B by means of a lever, O', and the piston or ram B' operating the valve or plug cock H of the ram B by means of a lever, O, as hereinbefore described, and illustrated in the drawings hereto annexed, and for the purpose set forth.

5. In liquid-meters, the secondary cover J', containing the inlet and outlet passages Q and R, and the back-pressure valve Z, and to which secondary cover J' a plate or false cover, $a$, containing the passage $b$, can be attached when the body of the meter is removed, as hereinbefore described, and illustrated in the drawings hereto annexed, and for the purpose set forth.

6. In liquid piston meters, the combination of the hollow pistons or rams composed of hardened india-rubber or gutta-percha with the collars through which they work, as hereinbefore described, and illustrated in the drawings hereto annexed, and for the purpose set forth.

7. In liquid-meters with uncontrolled, unconnected, or independent pistons or rams, the combination, with such pistons or rams, of stems screwed thereinto, whereby the displacements of such pistons or rams can be varied for the purpose of correcting or adjusting the accuracy of the measurement of the meters, as hereinbefore described, and illustrated in the drawings hereto annexed.

JOSEPH JOHN TYLOR.

Witnesses:
STEPHEN EDWARD GUNYON,
115 *Cannon Street, E. C.*
THOMAS DERRY,
2 *Newgate Street, E. C.*